United States Patent Office 3,558,697
Patented Jan. 26, 1971

3,558,697
PREPARATION OF ALKYLPHOSPHONOTHIOIC DIHALIDES
James B. Hinkamp, Birmingham, and Vincent F. Hnizda, Huntington Woods, Mich., assignors to Ethyl Corporation, New York, N.Y., a corporation of Virginia
No Drawing. Filed Sept. 8, 1967, Ser. No. 666,475
Int. Cl. C07f 9/42
U.S. Cl. 260—543     12 Claims

ABSTRACT OF THE DISCLOSURE

Alkyphosphonothioic dihalides are prepared in improved yields by reacting an alkyl aluminum sesquihalide with a thiophosphoryl halide in the absence of a hydrocarbon solvent. The reaction need not be carried out with pure thiophosphoryl halide. Instead, the thiophosphoryl halide can be in the mixture produced by reacting posphorous trihalide and sulfur with an aluminum trihalide catalyst.

BACKGROUND OF THE INVENTION

The preparation of alkylphosphonothioic dihalides in low yield has been described in German Pat. No. 1,235,-911. A need exists for an improved method which affords higher yields of product. This invention satisfies that need.

In contrast to the process of the German patent—which comprises the use of an alkyl aluminum having only one aluminum atom in the molecule—the process of this invention is based on the use of alkyl aluminum sesquihalides as the alkylating agent. The alkyl aluminum sesquihalides are old compounds. A method for their preparation is given by Coates, Organo-Metallic Compounds. John Wiley and Sons, Inc., New York, N.Y., Second edition (1960), page 140.

Thiophosphoryl halides used as starting materials are also old compounds and they have been described with methods for their preparation. In this regard, reference is made to U.S. Pats. Nos. 2,591,782, 2,715,561, 2,802,717, 2,850,353, 2,850,354, 2,911,281, and 2,915,361. The aforementioned Cook patent, U.S. 2,591,782, discloses a preparation of thiophosphoryl chloride from sulfur, phosphorus trichloride and an aluminum halide catalyst.

The alkyl phosphonothioic dihalides produced by the process of this invention are useful as chemical intermediates. One method of use has been described in U.S. 3,024,278.

SUMMARY OF THE INVENTION

In essence, this invention comprises the discovery that high yields of alkylphosphonothioic dihalides are obtained when a thiophosphoryl halide is reacted with an alkyl aluminum sesquihalide in the substantial absence of a hydrocarbon solvent. The thiophosphoryl halide used can be present in the reaction mixture produced by making it from phosphorus trihalide and sulfur using an aluminum halide catalyst.

DESCRIPTION OF THE PREFERRED EMBODIMENTS

A preferred embodiment of this invention comprises a process for the preparation of a compound having the formula $RPSX_2$; said process comprising the reaction of (i) a thiophosphoryl halide selected from $PSCl_3$ and $PSBr_3$, with
(ii) an alkyl aluminum sesquihalide having the formula $R_3Al_2X_3$, R being an alkyl radical having up to six carbon atoms, and X being a halogen of atomic number from 17 through 35, said reaction being conducted in the substantial absence of a hydrocarbon solvent. Because of their availability, use of ethyl or methyl aluminum sesquichlorides or bromides is preferred.

The preparation of alkyl phosphonothioic dihalides by the process of this invention is readily carried out by simply admixing the reactants. To achieve good yields in a reasonable time, reaction temperatures within the range of from about 30° to about 150° C. are used. Preferably, temperatures of from 50° to 100° C. are employed. The reaction pressure is not critical. Subatmospheric or elevated pressures can be used if desired. The reaction is conveniently carried out under ambient pressure. Preferably, the process is conducted under nitrogen, or in the presence of a similar inert atmosphere.

The reaction time is not a truly independent variable but is dependent at least to some extent on the inherent reactivity of reactants and the reaction temperature. In general, higher temperatures usually result in shortened reaction times. As a rule, the reaction of a thiophosphoryl trichloride and alkyl aluminum sesquihalide (according to the process of this invention) is complete within a period of about 15 minutes to 18 hours. In many instances, reaction times of about one to six hours are sufficient.

As stated above, the process of this invention is carried out in the substantial absence of a hydrocarbon solvent. By this it is meant that the reaction is carried out by reacting the thiophosphoryl halide and the alkyl aluminum sesquihalide without adding any common hydrocarbon solvent to the reaction zone. Any minor amount of hydrocarbon solvent present as an impurity in the starting materials is not overly deleterious. In other words, it is not necessary to carefully purify the starting materials to remove any traces of hydrocarbon solvent. Thus, it is possible to use readily available forms of the reactants.

The stoichiometry of the reaction is not critical. In general, best results are achieved if a stoichiometric amount or a slight excess of the alkyl aluminum sesquihalide is employed. Thus, it is preferred that from about 1.0 to about 1.2 theories of alkyl aluminum sesquihalide be employed per each mole of thiophosphoryl halide. A "theory" is the amount (on a mole basis) of sesquihalide theoretically required to react with one mole of $PSX_3$ to produce an alkylphosphonothioic dihalide.

Although not bound by any theory, it is believed that the preparation of alkylphosphonothioic dihalides according to this invention proceeds according to the following equation:

$$3PSX_3 + R_3Al_2X_3 \rightarrow RPSX_2 + 2RPSX_2 \cdot AlX_3$$

The complexed alkylphosphonothioic dihalide is freed by various methods. One of these methods involves pouring the reaction mixture over ice. A preferred method comprises treating the reaction mixture with an alkali metal halide such as sodium chloride. This treatment forms uncomplexed alkylphosphonothioic chloride and an alkali metal aluminum tetrahalide such as $NaAlCl_4$. In general, an approximately stoichiometric quantity of alkali metal halide is used; 1.0 to 1.5 moles per mole of phosphonothioic halide complex being preferred. After the reaction mixture has been so treated, the product can be separated from the reaction mixture by distillation. Preferably, the distillation is carried out under reduced pressure, say 18 to 50 mm. Hg.

The following examples serve to illustrate the process of this invention but do not limit it. All parts are by weight.

EXAMPLE 1

Phosphorus trichloride, 68.6 parts, and 6.5 parts of aluminum chloride were placed in a suitable reaction vessel. The vessel was purged with nitrogen and a nitrogen atmosphere maintained throughout the process. The mixture was heated to 55° C. and 16.3 parts of sulfur was added incrementally at 50–65° C.

Following this preparation of PSCl₃, 35.9 parts of methyl aluminum sesquichloride was added dropwise to the resultant reaction mixture. Addition was started at 63° C. and the temperature allowed to rise in ten minutes to 100° C. The rest of the methyl aluminum sesquichloride was added in 20 minutes at 100° C.

The resultant reaction mixture was allowed to cool to 30° C. and 36.5 parts of sodium chloride was added. Thereafter, the pressure in the vessel was lowered and heat applied until distillation began at 85° C. and 45 mm. Distillation was continued to a liquid temperature of 148° C. at 30 mm. Methyl phosphonothioic dichloride, $$CH_3PSCl_2$$

66 parts, was obtained. This corresponds to a yield of 87.7 percent based on PCl₃ and 83.5 percent based on methylaluminum sesquichloride.

In the process described above, 1.05 theories of methyl aluminum sesquihalide was used per mole of thiophosphoryl chloride. In another run, the amount of methyl aluminum sesquihalide was 1.0 theory. In this instance, the yield was 66.6 parts.

In contrast, when the reaction was carried out in a similar manner but in the presence of various hydrocarbon solvents, the reaction yield ranged from 44 to 65 percent. The hydrocarbon solvents used were various commercial brands of white mineral oils. Other hydrocarbons such as hexane also have a deleterious effect on the yield.

Repeating the above process in all particulars except that the preparation of PSCl₃ is conducted at 20° or 75° C. yields similar results. Similar results are also obtained when the reaction with ethyl aluminum sesquichloride is conducted at 110° or 130° C.

EXAMPLE 2

Sulfur, 478 parts, and 198 parts of aluminum chloride were charged to a suitable reaction vessel. A nitrogen atmosphere in the vessel was obtained by purging with nitrogen. The charged vessel was heated to 140° C. to melt the sulfur. Phosphorus trichloride, 2030 parts, was added over a four and one-half hour period to form PSCl₃. While the PCl₃ was being added, the temperature was allowed to fall gradually to 65° C.

Ethyl aluminum sesquichloride, 1294 parts ( a six percent excess) was added to the reaction mass over a six and one-half hour period at 70–85° C. Ten percent of the resultant reaction mass, 400 parts, was removed.

The resultant reaction mixture was cooled to 40° C. and 643 parts of sodium chloride was added. Thereafter, the system was evacuated to about 25 mm. Hg. The product was distilled from the reactant in 3.3 hours to a maximum liquid temperature of 145° C. An 84 percent yield of ethyl phosphonothioic dichloride was obtained. The product was slightly greater than 98 percent pure.

EXAMPLE 3

The process of this example was essentially similar to the process of Example 2 with the following exceptions: (1) the 400 parts of reaction mass removed in the above example was used instead of aluminum trichloride to catalyze the reaction, and (2) the amount of sulfur was increased to 486 parts.

The product was distilled from the reaction vessel over a six-hour period to a maximum liquid temperature of 145° C. and at a pressure of about 25 mm. An 82.5 percent yield (2187 parts) of ethyl phosphonothioic dichloride was obtained. Vapor phase chromatographic analysis showed that the product was 99.1 percent pure.

Repetition of this process, with the exception that the alkylation with ethyl aluminum sesquichloride, is carried out at 100° C. and the product is isolated by distillation at 190° C. yields similar results.

EXAMPLE 4

Phosphorus trichloride, 412.2 parts, and aluminum chloride, 39.0 parts, were charged to a suitable reaction vessel which had been flushed with nitrogen. The mixture was heated to 60° C. and then 96.2 parts of sulfur were added over a period of 15 minutes. During the addition the temperature was maintained between 60 and 68° C. In this preparation of PSCl₃ the mole ratio of PCl₃ to aluminum chloride to sulfur was 1:0.1:1.

To the resultant reaction mixture was added 266 parts of ethyl aluminum sesquichloride. The addition was initiated at 62° C. and the bulk of the material was added at a temperature within the range of 75–85° C. The entire change of sesquichloride was added in 66 minutes. Thereafter, 140 parts of ground sodium chloride was added to the resultant reaction mass. In this preparation of ethyl phosphonothioic dichloride the amount of aluminum sesquichloride to PSCl₃ was 1.075 theories.

The resultant reaction mass was distilled over a one and one-half hour period. The distillation was terminated at a maximum liquid temperature of 150° C. and a minimum pressure of 25 mm. Hg. Ethyl phosphonothioic dichloride, 467.8 parts (95.6 percent yield) was obtained. Vapor phase chromatographic analysis showed that the product was 97.8 percent pure.

A sample of the ethyl aluminum sesquichloride used in the above reaction was hydrolyzed and the evolved gases were analyzed by vapor phase chromatographic analysis. The analysis indicated that the evolved gas was 99.5 mole percent ethane and 0.5 mole percent butane.

EXAMPLE 5

Following the procedure of Example 4, another batch of ethyl phosphonothioic dichloride was produced. In this run the amount of aluminum sesquichloride was 1.07 moles per mole of PSCl₃. The product was recovered from the reaction mixture by distillation at a temperature of 150° C. at 25 mm. pressure. A 95.6 percent yield of product was obtained. VPC analysis of the product showed that it was 97.8 weight percent pure and that it contained 1.4 percent PSCl₃ and 0.22 percent C₄H₉PSCl₂ impurities.

EXAMPLE 6

The process of Example 1 is repeated except that PBr₃ and ethyl aluminum sesquibromide are employed. Methyl phosphonothioic dibromide is obtained.

EXAMPLE 7

Following the procedure of Example 2:

propylphosphonothioic dichloride is prepared using propyl aluminum sesquichloride and PCl₃
isopentylphosphonothioic dichloride is prepared from isopentyl aluminum sesquichloride and PCl₃
n-hexylphosphonothioic dibromide is prepared from n-hexyl aluminum sesquibromide dibromide and PBr₃.

While the invention has been described with reference to various examples and embodiments it will be apparent to a skilled practitioner that various modifications can be made without departing from the spirit and scope of the appended claims.

We claim:

1. A process for the preparation of a compound having the formula:

$$RPSX_2$$

said process comprising the reaction of (i) a thiophosphoryl halide having the formula $$PSX_3$$

with (ii) an alkyl aluminum sesquihalide having the formula $$R_3Al_2X_3$$

wherein R is an alkyl radical having having up to six carbon atoms, and X is a halogen of atomic number from 17 through 35;

said reaction being conducted in the substantial absence of a hydrocarbon solvent, and a temperature of about 50° to about 130° C.

2. The process of claim 1 wherein said thiophosphoryl halide is $PSCl_3$ and said sesquihalide is ethyl aluminum sesquichloride.

3. The process of claim 2 being conducted at a temperature of from about 70° to about 85° C.

4. The process of claim 1 wherein said thiophosphoryl halide is $PSCl_3$ and said sesquihalide is methyl aluminum sesquichloride.

5. The process of claim 4 being conducted at a temperature of from about 60° to about 100° C.

6. A process for the preparation of a compound selected from the class consisting of $CH_3PSCl_2$ and $C_2H_5PSCl_2$, said process comprising
   (a) preparing thiophosphoryl trichloride by reacting sulfur with phosphorus trichloride in the presence of a catalytic quantity of aluminum chloride at a temperature within the range of from about 20° to about 75° C., and
   (b) reacting said thiophosphoryl trichloride in the thereby produced reaction mixture with a sesquihalide selected from methyl aluminum sesquichloride and ethyl aluminum sesquichloride at a reaction temperature of from about 60° to about 100° C., said process being conducted in the substantial absence of added hydrocarbon solvent.

7. The process of claim 6 wherein Step (a) comprises the addition of said phosphorus trichloride to a mixture of said sulfur and aluminum chloride catalyst.

8. The process of claim 7 wherein said sesquichloride is methyl aluminum sesquichloride.

9. The process of claim 8 wherein said sesquichloride is ethyl aluminum sesquichloride.

10. The process of claim 9 being further characterized by the recovery of the ethyl phosphonothioic dichloride reaction product from the resultant reaction mixture by (i) treating said resultant reaction mixture with sodium chloride and (ii) thereafter distilling the resultant mass at a reduced pressure of from about 18 to about 25 mm. Hg and at a temperature of from about 145° to about 190° C.

11. The process of claim 1 wherein from about 1.0 to about 1.2 theory of alkyl aluminum sesquihalide is employed per each mole of thiophosphoryl halide.

12. A process for the preparation of a compound having the formula $RPSX_2$, said process comprising
   (a) preparing a thiophosphoryl halide having the formula $PSX_3$ by reacting sulfur with a phosphorus trihalide, $PX_3$, in the presence of a catalytic quantity of an aluminum trihalide, $AlX_3$, wherein X is a halogen of atomic number from 17 through 35, at a temperature within the range of from about 20° to about 75° C., and
   (b) reacting said thiophosphoryl halide in the reaction mixture thereby produced with an alkyl aluminum sesquihalide having the formula $R_2Al_2X_3$, wherein X is as defined above and R is an alkyl group of up to about six carbon atoms, at a reaction temperature of from about 60° to about 100° C.

References Cited

Kararanov et al.: Chemical Abstracts, vol. 63 (1958), p. 4327.

Okhlobystin et al.: Academy Science, U.S.S.R. (1958), pp. 977–979 (English translation).

LORRAINE A. WEINBERGER, Primary Examiner

E. J. GLEIMAN, Assistant Examiner